Patented Jan. 13, 1925.

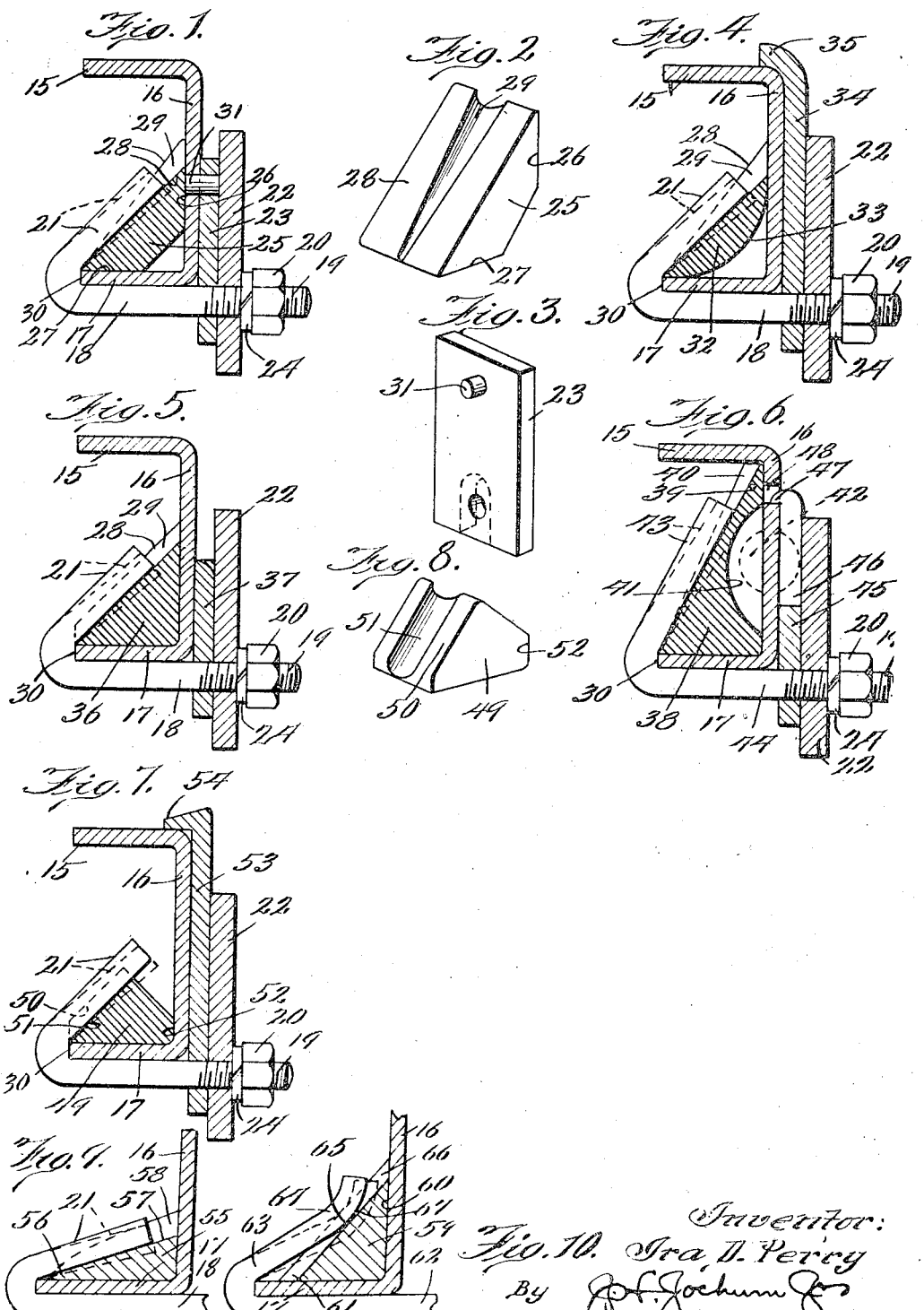
Jan. 13, 1925.
I. D. PERRY
ATTACHING DEVICE FOR AUTOMOBILE BUMPERS
Filed March 1, 1924
1,522,647

1,522,647

UNITED STATES PATENT OFFICE.

IRA D. PERRY, OF CHICAGO, ILLINOIS.

ATTACHING DEVICE FOR AUTOMOBILE BUMPERS.

Application filed March 1, 1924. Serial No. 696,121.

*To all whom it may concern:*

Be it known that I, IRA D. PERRY, a citizen of the United States, residing at Chicago, in the county of Cook and State of Illinois, have invented certain new and useful Improvements in Attaching Devices for Automobile Bumpers, of which the following is a specification.

This invention relates to improvements in attaching device particularly adapted though not necessarily limited in its use for mounting or supporting bumpers upon the chassis or frame members of an automobile.

More specifically the invention relates to a bolt of that type commonly known as a "hook-bolt" which is provided with a hooked or turned back end adapted to engage the vehicle frame member, the shank of the bolt passing through the supporting or attaching arm or bracket of the bumper structure.

Heretofore bolts of this character have been of a rigid construction with the result that when the nut is tightened upon the shank of the bolt the hook shaped end will be caused to clamp the edge of the flange of the vehicle frame member, but with not sufficient firmness to prevent the bumper and spacing member from slipping down with respect to the vehicle frame member to which it is attached.

This tendency of the bumper to slip down is increased by the hook-bolt itself by reason of the fact that the bolt will have a tendency to rock about the point of engagement of the end of the slot in the hooked end of the bolt with the edge of the flange of the frame member, as the slot is generally of a width considerably greater than the thickness of the flange.

It is one of the objects of the present invention to provide an improved construction of hook-bolt in which the hooked or turned back end of the bolt will be resilient with respect to the shank of the bolt, with the result that when the bolt is in position for use and the nut is tightened upon the shank itself, the resilient end of the bolt will be placed under tension. This operation will have a tendency to cause the shank of the bolt to rock about the point of contact of the end of the slot in the bolt with the edge of the flange over which the bolt engages, and will tend to elevate the other or nut carrying end of the bolt and cause the shank of the bolt to rest and be maintained flat against the bottom of the flange over which the hook engages.

A further object is to provide improved means for causing the resilient end of the bolt to compensate the varying conditions of the flange or supporting element over which it engages.

A further object is to provide improved means for sustaining or preventing the spacing member between the bumper and support from dropping or slipping down.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which—

Figure 1 is a view in elevation of a bolt constructed in accordance with the principles of this invention and showing the same as employed for securing a bumper to the chassis or frame member of a vehicle, the frame member, bumper, and spacing member being in section.

Figure 2 is a perspective view of the filler block shown in Figure 1.

Figure 3 is a detail perspective view of the spacing member for the bumper.

Figure 4 is a view similar to Figure 1 of another form of the invention.

Figure 5 is a view similar to Figure 1 of another form of the invention.

Figure 6 is a view similar to Figure 1 of another form of the invention.

Figure 7 is a view similar to Figure 1 of another form of the invention.

Figure 8 is a detail perspective view of the filler block shown in Figure 7.

Figure 9 is a view partly in elevation and partly in section of another form of the invention.

Figure 10 is a view similar to Figure 9 of another form of the invention.

Referring more particularly to the drawing the numeral 15 designates generally the chassis or frame member of a vehicle and which member is preferably provided with a vertical web 16 and a horizontal flange 17.

The bolt consists essentially of a shank portion 18, one end of which is provided with threads as at 19 for the reception of a nut or collar 20. The other end of the bolt is bent backwardly upon itself to form a rearwardly projecting portion 21. This portion 21 is resilient and may be of any desired length and configuration. The numeral 22 designates a supporting member, bracket, or portion of the bumper which is to be secured to the frame member 15, a spacing member 23 being preferably interposed between the vertical web 16 of the frame member and the bumper member 22 for holding the latter spaced from the web and in proper position so that any bolts or rivets which might be present adjacent the outer face of the web 16 will not interfere with the proper positioning of the bumper member 22.

In use the spacing member 23 and the bumper member 22 are placed in position with respect to the vertical web of the member 15 and the shank 18 of the bolt will pass through the spacing member and the bumper, the hooked end 21 of the bolt engaging over the edge of the flange 17. The nut 20 is then tightened upon the shank 18 so as to cause the end of the slot or space formed by the turned back or hooked end 21 of the bolt, to clamp the flange and draw the bumper 22 and spacing member 23 against the web 16. If desired a lock nut 24 may be provided for locking the nut 20.

In the form of the invention shown in Figure 1 a filler or holding block or element 25 is interposed between the flange 17 and vertical web 16, and the turned back or hooked end 21 of the bolt. The ends 26 and 27 of the block 25 are preferably beveled as shown so as to respectively abut the vertical web 16 and the flange 27. The face 28 of the block 25 is inclined as shown and is provided with a groove or channel 29. In assembling the parts the block 25 is first placed upon the flange 17 so that the end 27 will rest against the flange and the end 26 will rest against the vertical web 16, after which the hooked end of the bolt is engaged over the edge of the flange 17 so that the hooked or turned back resilient portion 21 of the shank will engage the face 28 of the block and rest within the channel 29. The nut 20 is then tightened so as to draw the shank of the bolt 18 forwardly until the edge of the flange 17 engages the end wall of the space in the hook-bolt. As the nut 20 is adjusted upon the shank 18 it will be manifest that the resilient end 21 of the bolt will be placed under tension and this tension will not only serve as a means for holding the block 25 in position but will cause the edge of the slot in the bolt to co-operate with the edge of the flange 17 at the point 30 to form a fulcrum, so to speak, for the shank of the bolt. The tension thus exerted will have a tendency to elevate the opposite end of the shank of the bolt and cause the same to rest flat against the lower surface of the flange 17, thereby overcoming any tendency of the bumper and spacing member from slipping or dropping down with respect to the supporting web 16.

If desired the spacing member 23 may be provided with a projecting lug or pin 31 adapted to enter a suitable aperture in the web 16 for assisting in supporting the spacing member.

It will be manifest that inasmuch as the tension of the resilient portion of the bolt engages the block 25, it will assist in holding the block in position and will also, during the adjustment of the collar or nut 20 on the bolt cause the block 25 to assume a proper position with relation to the web 16 and flange 17.

In the form of the invention shown in Figure 4, the block 32 is of a slightly different configuration having a convexed or rounded bottom 33 and the spacing member 34 is provided with a deflected portion 35 adapted to engage over the top of the frame member 15, the pin or lug 31 being dispensed with in this form of the invention.

In the form of the invention shown in Figure 5, the filler block 36 is of a configuration to substantially fill the angle between the web 16 and the flange 17, and the spacing member 37 is supported entirely by the shank 18 of the bolt passing therethrough and the clamping action exerted thereupon by the web 16 and bolster member 22.

In the form of the invention shown in Figure 6, the filler block 38 is of a configuration to rest upon the flange 17 with the front edge of the block substantially flush with the edge of the flange 17 and the rear wall of the block engages the vertical web 16. The block 38 is of a height substantially equal to the space between the upper and lower flanges of the frame member carried by the web 16, the face 39 of the block being inclined and channeled as at 40, while the rear of the block is cut away or recessed as at 41 to provide for the entrance of the head of a bolt or rivet 42 which might be carried by the web member 16. In this form of the invention the bent back resilient end 43 of the bolt 44 is of a length somewhat greater than the length of the resilient end of the forms of the bolt shown in Figures 1, 4 and 5.

The spacing member 45 is preferably slotted as at 46 and is provided with a deflected or hooked portion 47 at its upper edge adapted to enter a recess or aperture 48 in the web 16 to assist in supporting the spacing member. The slotted portion 46 of the spacing member also serves to receive the head of the bolt or rivet 42.

In the form of the invention shown in

Figure 7, the filler block 49 is of a slightly different configuration, being preferably in the form of a pyramidal member, the inclined face 50 of the block being channeled as at 51 to receive the resilient end 21 of the bolt. One edge of the block terminates substantially flush with the forward edge of the flange 17 and the rear end 52 of the block preferably abuts the flange 16. The spacing member 53 is provided with a flange 54 at the upper edge thereof adapted to engage over a portion of the frame member 15 for assisting in supporting the spacing member 53.

In the form of the invention shown in Figure 9, the spacing block 55 is of a size that the rear end thereof will engage the vertical web 16 while the forward extremity 56 of the block preferably terminates short of the edge of the flange 17, the inclined face 57 of the block being channeled as at 58 to receive the resilient end 21 of the bolt.

In Figure 10 the form of the block 59 is such that one edge 60 will engage the vertical web 16 and the forward edge 61 of the block will terminate short of the front edge of the flange 17. The bolt 62 in this form of the invention is provided with a bent-back resilient extremity and this extremity is bent upwardly as at 63 and is longitudinally curved as at 64 to form a surface 65 which engages in the channel 66 in the inclined surface 67 of the block 59.

In all of the forms of the invention thus far described the extremity of the resilient portion of the bolt terminates short of the web 16 of the supporting member so that the extremity of the resilient portion will be free and a tension will be exerted upon the filler block substantially throughout the entire length of such resilient portion.

In each of the forms of the invention it will be noted that the angle of inclination of the face of the filler member which is engaged by the resilient end of the bolt is different from the normal angle of inclination of the said end of the bolt, so that the end of the bolt will be placed under considerable tension when the nut is tightened upon the bolt.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. An attaching device embodying a bolt having a substantially straight shank and a resilient hooked or turned back extremity, said extremity being adapted to engage over the edge of a flange or supporting element, and a surface adapted to be engaged by the said extremity of the bolt, the said surface having an angle of inclination different from the normal angle of inclination of the said extremity of the bolt.

2. An attaching device embodying a bolt having a substantially straight shank and a resilient hooked or turned back extremity, said hooked extremity being adapted to engage over the edge of a flange of a supporting member, the free extremity of said resilient portion of the bolt terminating short of the web of the said supporting member and having a normal angle of inclination different from the plane of inclination of the surface of the flange or supporting member that is engaged by said extremity of the bolt.

3. An attaching device embodying a bolt having a substantially straight shank and a resilient hooked or turned back extremity, said extremity being adapted to engage over the edge of a flange or supporting element, and a filler block supported by the said flange and disposed between the flange and the said resilient extremity of the bolt.

4. An attaching device embodying a bolt having a substantially straight shank, one end of the bolt being turned back to form with the shank a hooked shaped portion, said turned back portion being resilient and adapted to engage over the edge of a flange on a supporting member, and a filler block disposed between the said flange and the said turned back portion.

5. An attaching device embodying a bolt having a substantially straight shank, one end of the bolt being turned back to form with the shank a hooked shaped portion, said turned back portion being resilient and adapted to engage over the edge of a flange on a supporting member, and a filler block disposed between the said flange and the said turned back portion, the face of the block contacted by the said portion of the bolt being inclined.

6. An attaching device embodying a bolt having a substantially straight shank, one end of the bolt being turned back to form with the shank a hooked shaped portion, said turned back portion being resilient and adapted to engage over the edge of a flange on a supporting member, and a filler block disposed between the said flange and the said turned back portion, the face of the block contacted by the said portion of the bolt being inclined and having a channel to receive said portion.

7. An attaching device embodying a bolt having a substantially straight shank, one end of the bolt being turned back to form with the shank a resilient hook shaped portion, adapted to hook over the edge of a flange on a supporting member, and a filler block disposed between the flange and the said resilient portion and engaged by the said portion, the face of the block with which the resilient portion of the bolt engages being inclined, said block abutting the web of the said supporting member.

8. An attaching device embodying a bolt having a substantially straight shank, one end of the bolt being turned back to form with the shank a resilient hook shaped portion adapted to hook over the edge of a flange on a supporting member, and a filler block disposed between the flange and the said resilient portion and engaged by the said portion, the face of the block with which the resilient portion of the bolt engages being inclined, said block abutting the web of the said supporting member, the extremity of the said resilient portion of the bolt terminating short of the said web.

9. An attaching device embodying a bolt having a substantially straight shank, one end of the bolt being turned back to form with the shank a resilient hook shaped portion adapted to hook over the edge of a flange on a supporting member, and a filler block disposed between the flange and the said resilient portion and engaged by the said portion, the face of the block with which the resilient portion of the bolt engages being inclined, said block abutting the web of the said supporting member, the face of the block engaged by the said resilient portion of the bolt being channeled to receive said portion, the extremity of the said resilient portion terminating short of the said rib.

10. An attaching device embodying a bolt having a substantially straight shank, one end of the bolt being turned back to form with the shank a resilient hook shaped portion adapted to hook over the edge of a flange on a supporting member, a filler block disposed between the flange and the said resilient portion and engaged by the said portion, the face of the block with which the resilient portion of the bolt engages being inclined, said block abutting the web of the said supporting member, in combination with a bumper member, and a bumper spacing member and through which last two recited members the shank of the bolt passes.

11. An attaching device embodying a bolt having a substantially straight shank, one end of the bolt being turned back to form with the shank a resilient hook shaped portion adapted to hook over the edge of a flange on a supporting member, a filler block disposed between the flange and the said resilient portion and engaged by the said portion, the face of the block with which the resilient portion of the bolt engages being inclined, said block abutting the web of the said supporting member, in combination with a bumper member, a bumper spacing member and through which last two recited members the bolt passes, and means for assisting in maintaining the said spacing member in position.

12. An attaching device embodying a bolt having a substantially straight shank, one end of the bolt being turned back to form with the shank a resilient hook shaped portion adapted to hook over the edge of a flange on a supporting member, a filler block disposed between the flange and the said resilient portion and engaged by the said portion, the face of the block with which the resilient portion of the bolt engages being inclined, said block abutting the web of the said supporting member, in combination with a bumper member, a bumper spacing member and through which last two recited members the bolt passes, and interengaging means between the said spacing member and the first recited member for assisting in maintaining the spacing member in position.

13. An attaching device embodying a bolt having a substantially straight shank, one end of the bolt being turned back to form with the shank a hooked shaped portion, said turned back portion being resilient and adapted to engage over the edge of a flange on a supporting member, and a filler block disposed between the said flange and the said turned back portion, the said resilient portion of the bolt operating by the tension exerted thereby upon the said block to position the latter with respect to the said supporting member and flange.

14. An attaching device embodying a bolt having a substantially straight shank, one end of the bolt being turned back to form with the shank a hooked shaped portion, said turned back portion being resilient and adapted to engage over the edge of a flange on a supporting member, a filler block disposed between the said flange and the said turned back portion, the face of the said block which is engaged by the said resilient end of the bolt being inclined and channeled to receive said end, the tension exerted by the said end upon the said block operating to automatically position the block with respect to the said flange and supporting member.

15. An attaching device embodying a bolt having a substantially straight shank and a resilient hooked or turned back extremity, said extremity being adapted to engage over the edge of a flange or supporting element, and a filler block supported by the said flange and disposed between the flange and the said resilient extremity of the bolt, the face of the said block which is engaged by the said extremity of the bolt having a different angle of inclination than the normal angle of inclination of the resilient end of the bolt.

16. An attaching device embodying a bolt having a substantially straight shank and a resilient hooked or turned back extremity, said extremity being adapted to engage over the edge of a flange or supporting element, and a filler block supported by the said flange and disposed between the flange and the said resilient extremity of the bolt, the face of the said block which is engaged by the said extremity of the bolt having a different angle of inclination than the normal angle of inclination of the resilient end of the bolt, the said face of the block having a recess in which the said end of the bolt rests.

In testimony whereof I have signed my name to this specification on this 28th day of February. A. D. 1924.

IRA D. PERRY.